INVENTOR.
WALTER S. DRUZ
BY Francis W. Crotty
HIS ATTORNEY

INVENTOR.
WALTER S. DRUZ
BY Francis W. Crotty
HIS ATTORNEY.

Aug. 7, 1956 W. S. DRUZ 2,758,154

SUBSCRIPTION TELEVISION RECEIVER

Filed Aug. 1, 1951 5 Sheets-Sheet 3

INVENTOR.
WALTER S. DRUZ
BY Francis W. Crotty
HIS ATTORNEY.

INVENTOR.
WALTER S. DRUZ
BY Francis W. Crotty
HIS ATTORNEY.

INVENTOR.
WALTER S. DRUZ
BY Francis W. Crotty
HIS ATTORNEY.

2,758,154

SUBSCRIPTION TELEVISION RECEIVER

Walter S. Druz, Chicago, Ill., assignor to Zenith Radio Corporation, a corporation of Illinois Application August 1, 1951, Serial No. 239,651

7 Claims. (Cl. 178—5.1)

Figure 1:
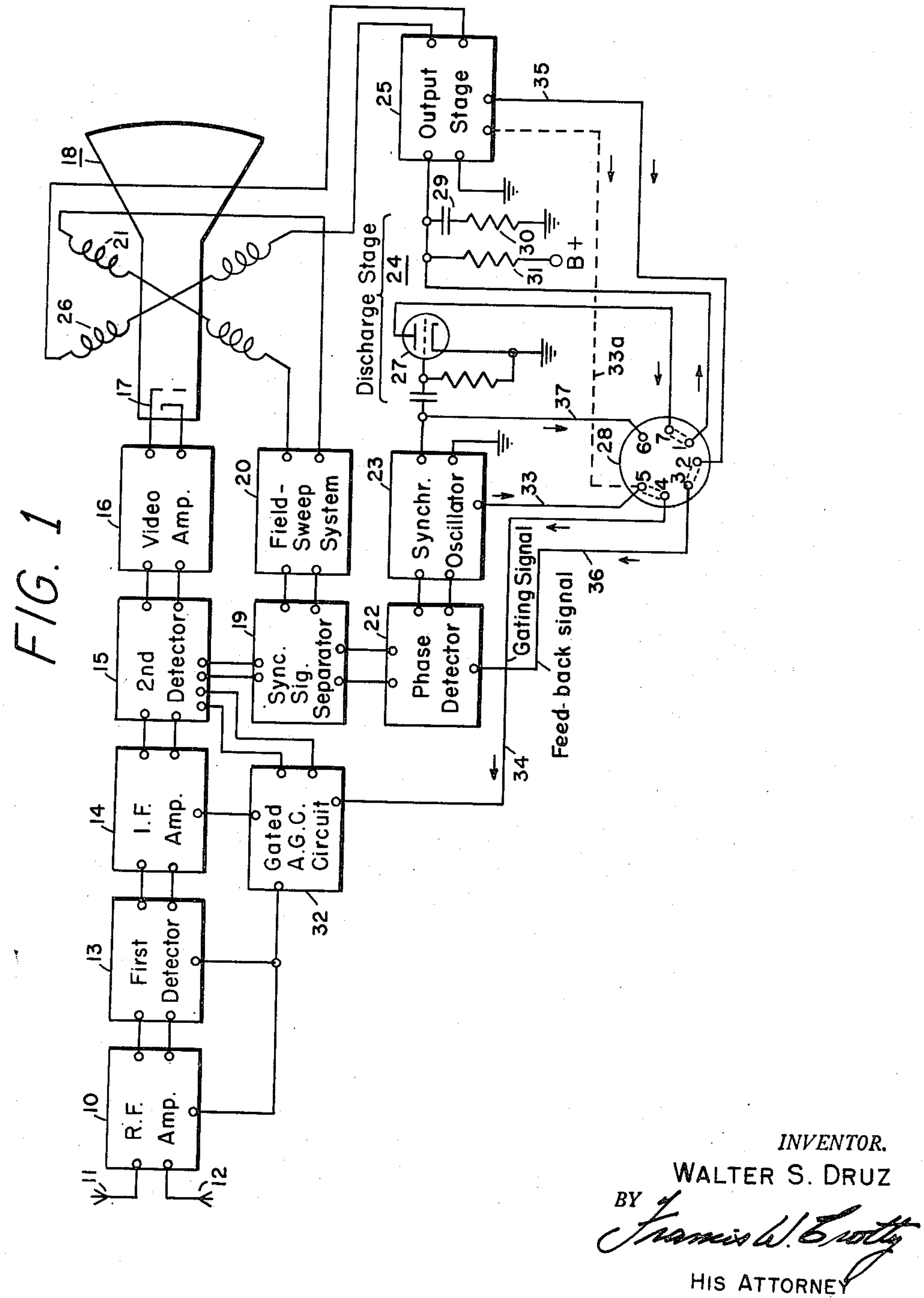

This invention relates to an improved subscription television receiver for decoding and reproducing subscription television signals wherein the coding is manifested by variations of the time relation of certain components constituting the television signal.

Patent 2,547,598, April 3, 1951, by Erwin M. Roschke, entitled "Subscription, Image Transmission System and Apparatus," assigned to the present assignee, discloses a subscription television system to which the present invention is especially applicable. In the Roschke system, a television signal is coded in accordance with a certain schedule and then radiated to subscriber receivers, and a key signal indicating the coding schedule is made available to the subscriber receivers over a line circuit, such as a telephone line. A metering device is included in the line circuit to record the length of time the key signal is used by each subscriber so that a suitable charge may be made for the subscription service. Coding in the Roschke system is effected by altering the timing of the video components relative to the line-synchronizing components of the television signal during spaced intervals and in accordance with a coding schedule. The times of occurrence of the spaced intervals are indicated to the receiver by bursts of key signal on the line circuit, and suitable decoding apparatus responsive to these bursts produces properly timed compensating alterations in timing so that the receiver decodes and reproduces the television signal. One specific embodiment of the Roschke patent shows the decoding apparatus coupled into the line-sweep system of the receiver, and responding to the bursts of key signal to alter the timing of the line-sweep signal applied to the picture-reproducing device by an appropriate amount and in the correct sense effectively to compensate for the timing variations of the coded television signal.

The line-sweep system of most present-day television receivers is of the automatic-frequency-controlled type, comprising a cascade-connected phase detector, synchronized oscillator, discharge stage and output stage having a feed back connection to the phase detector. The phase detector compares the signal developed by the output stage with the incoming line-synchronizing signals to develop a control potential for the synchronized oscillator having amplitude variations related to phase changes between these signals. When decoding apparatus is connected into such a sweep system, as described above, the line-sweep signal developed by the output stage no longer has an invariable timing with respect to the incoming synchronizing signals, but has a timing that varies during spaced intervals due to the action of the decoding apparatus. For this reason, the signal produced by the output stage is not suitable for application to the phase detector.

It is, accordingly, an object of the present invention to provide an improved subscription television receiver having a sweep system of the automatic-frequency-controlled type wherein the timing of the sweep signal is varied in accordance with a certaian coding schedule for decoding purposes, and wherein a periodic signal is developed which is suitable for application to a phase detector for synchronizing purposes.

Many present-day television receivers also include an automatic-gain-control circuit gated to respond only to the line-synchronizing components of a received television signal. The gating signal for this gain control circuit is often derived from the output stage of the sweep system which provides a suitably-phased signal of sufficient amplitude. However, when the timing of the sweep system is varied to permit the receiver to utilize a subscription television signal coded in the aforedescribed manner, the signal developed by the output stage has a variable timing and is no longer suitable for gating the automatic-gain-control circuit.

It is, accordingly, another object of the invention to provide an improved subscription television receiver having an AFC type sweep system wherein the timing of the sweep signal is controlled in accordance with a coding schedule, and wherein an appropriate periodic signal is provided for gating the automatic-gain-control circuit.

The improved subscription television receiver of this invention in its broad aspect comprises a decoder connected into the sweep system between the frequency controlled oscillator and output stages, for varying the timing of the sweep signal developed by the sweep system relative to applied synchronizing pulses in accordance with a prescribed coding schedule. It further comprises a network connected to the frequency-controlled oscillator for developing a periodic signal synchronized with the applied synchronizing pulses and having a timing unrelated to the timing variations of the aforementioned sweep signal.

Figure 2:
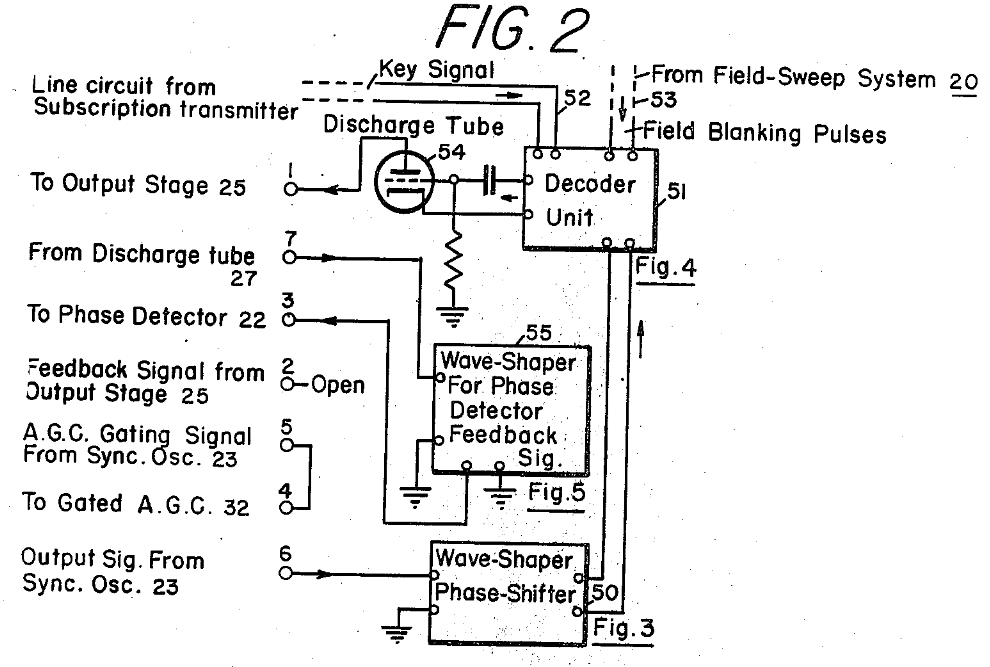
Figure 3:
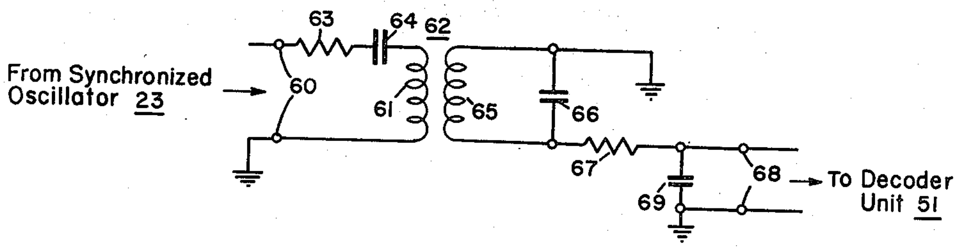
Figure 4:
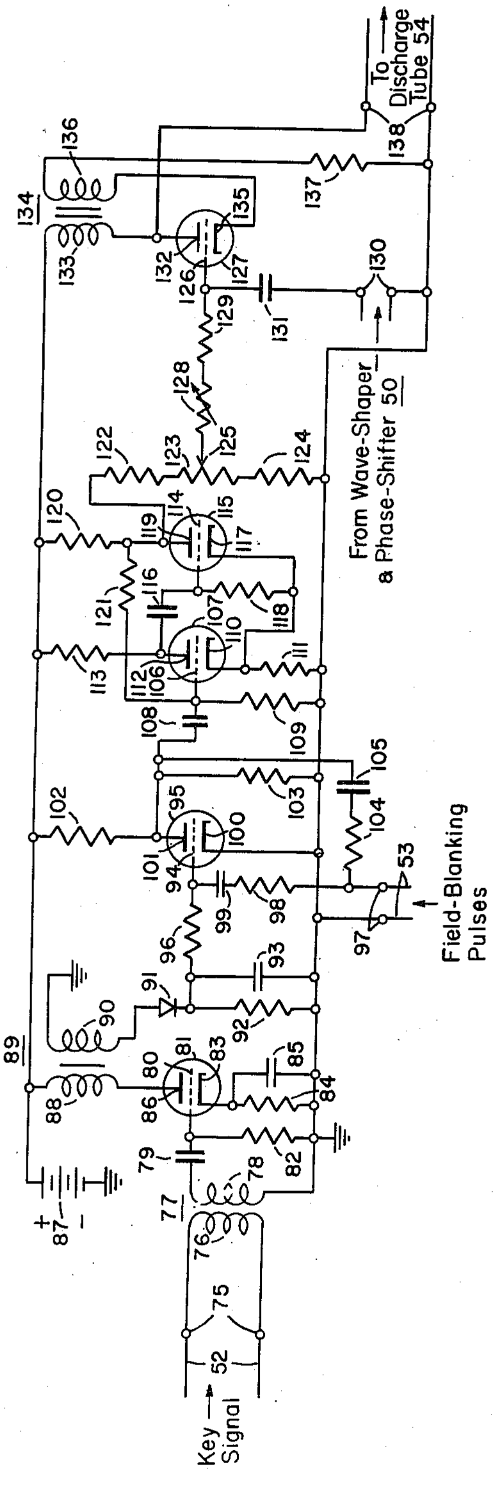
Figure 5:
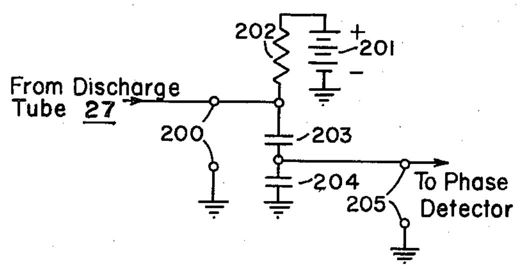
Figure 7:
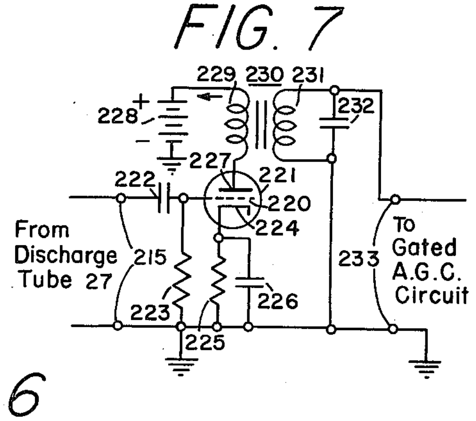
Figure 6:
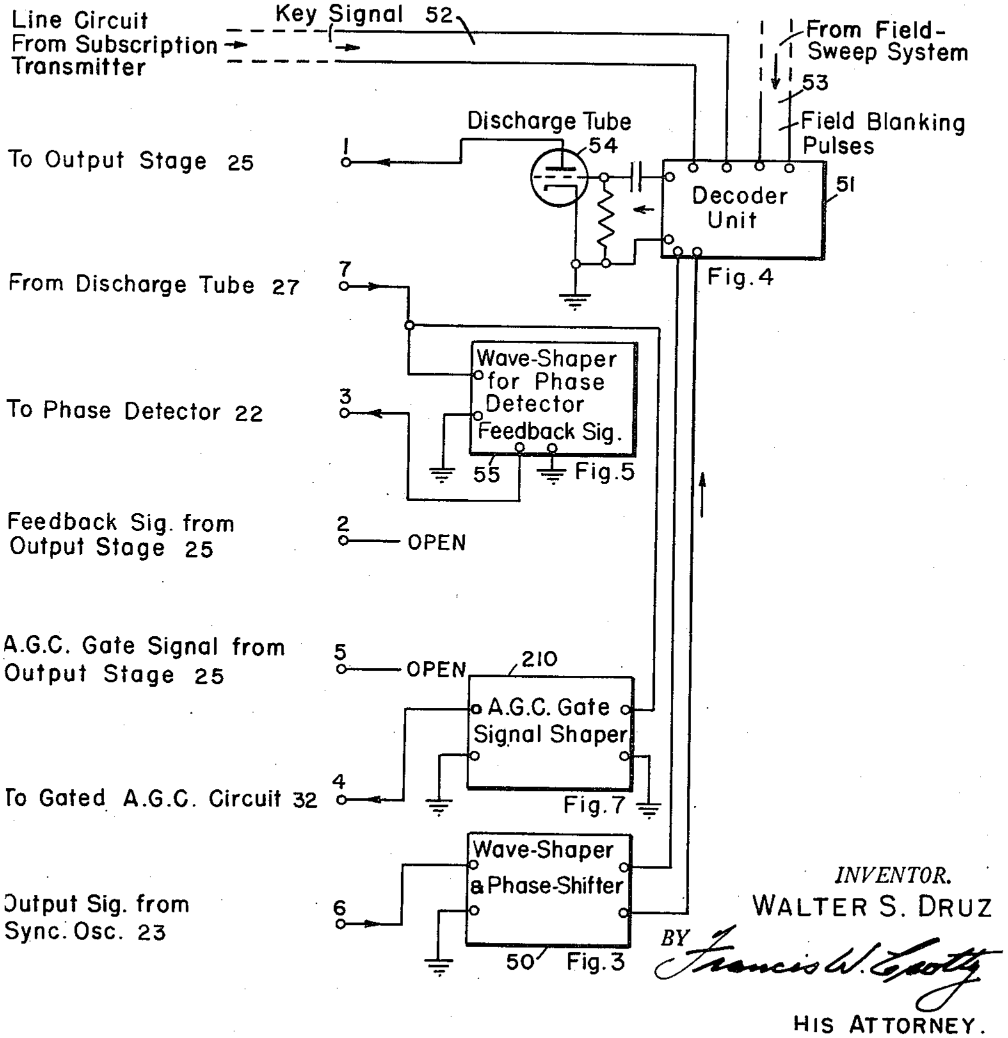
Figure 8:
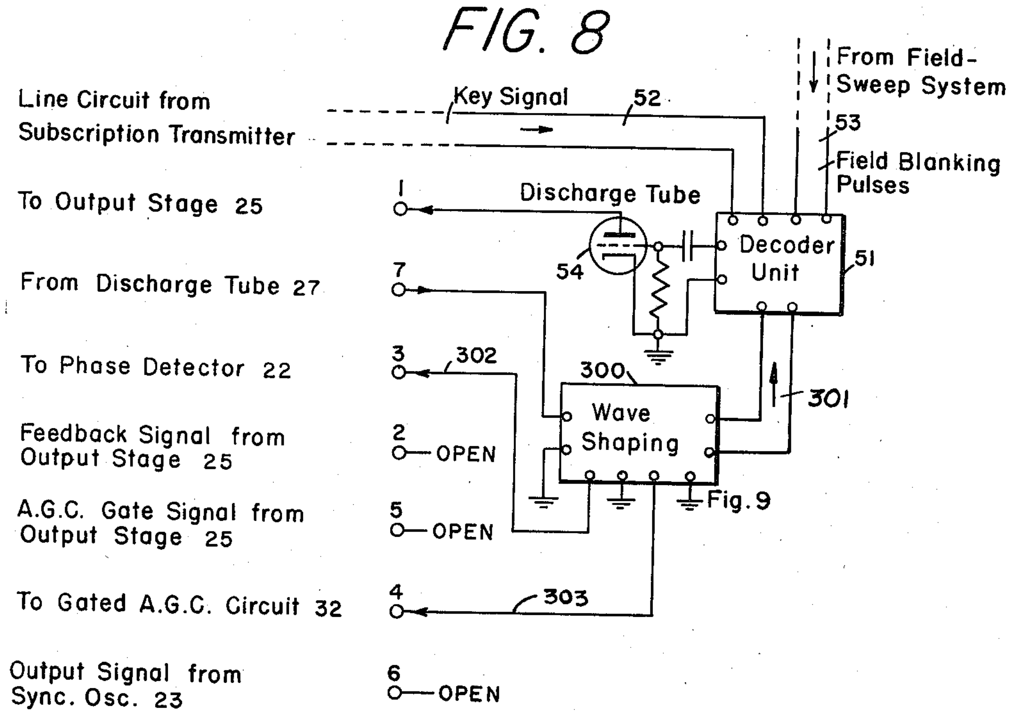
Figure 9:
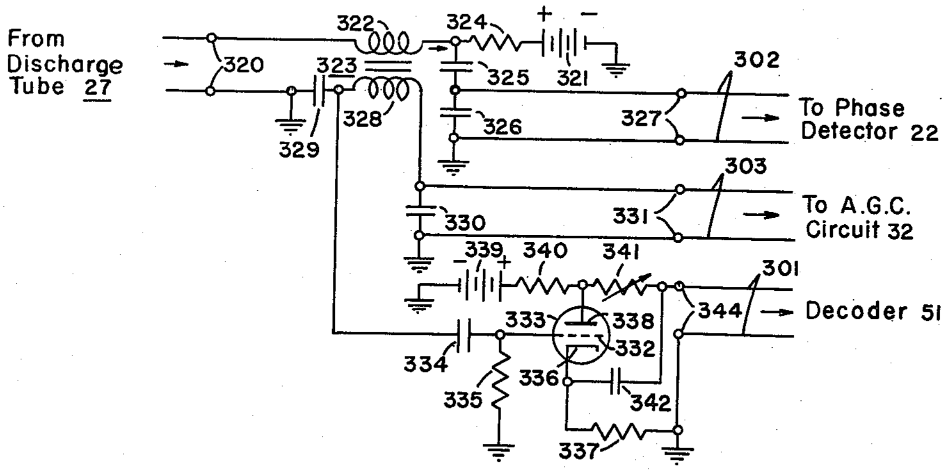

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a television receiver of present-day construction having suitable connections for receiving the improved adapter of this invention, Figure 2 shows one embodiment of the invention, Figures 3, 4 and 5 are detailed representations of various components of the invention, shown in block form in Figure 2, Figure 6 shows a second embodiment of the invention, Figure 7 is a detailed representation of one of the components of the embodiment shown in Figure 6, Figure 8 shows a third embodiment of the invention, and Figure 9 is a detailed diagram of one of the components of the embodiment of Figure 8.

As previously mentioned, the television receiver shown in Figure 1 is of well-known construction and includes a radio-frequency amplifier 10 of one or more stages having input terminals connected to an antenna circuit 11, 12 and output terminals connected to a first detector 13. This detector, in turn, is connected through an intermediate-frequency amplifier 14 of any desired number of stages to a second detector 15. Second detector 15 is connected to a video amplifier 16 of one or more stages having output terminals coupled to the input electrodes 17 of an image-reproducing device 18. Second detector 15 is also connected to a synchronizing-signal separator 19 which is coupled to a field-sweep system 20 having output terminals connected to the field-deflection elements 21 of device 18.

The synchronizing-signal separator is also connected to the line-sweep system of the receiver comprising a phase-detector 22, a frequency-controlled oscillator 23, a discharge stage 24 and an output stage 25, all connected in cascade in well-known manner. The output terminals of output stage 25 are connected to the line-deflection elements 26 associated with device 18. Discharge stage 24 is shown in detail and consists of an electron-discharge tube 27 having an input circuit connected to oscillator 23 and having an anode connected in a discharge circuit through terminals 1 and 7 of a socket 28. The discharge circuit comprises a discharge capacitor 29 connected to ground through a peaking resistor 30, the anode side of capacitor 29 being connected to the positive terminal B+ of a source of unidirectional potential through a resistor 31.

Second detector 15 is also connected to an automatic-gain-control (AGC) circuit 32 having output terminals connected to stages 10, 13 and 14 to control the gain of these stages in accordance with the peak amplitude of the line-synchronizing components of a received television signal, as is well known. The AGC circuit 32 may be of the gated type disclosed in copending application Serial No. 39,368, filed July 17, 1948, in the name of Albert Cotsworth III, and issued April 15, 1952 as Patent 2,593,011, entitled "Automatic Gain Control for Television Receivers," assigned to the present assignee, and derives a gating signal from oscillator 23 by way of terminals 4 and 5 of socket 28 through leads 33, 34. When desired, the gating signal for the AGC circuit may be derived from output stage 25 by way of a lead 33*a*, represented by the broken construction line, terminals 4 and 5, and lead 34.

The socket 28 constitutes an appropriate connector for the adapter of this invention and enables the adapter to be conveniently connected into the circuit of the receiver. A feed-back signal for phase detector 22 is derived from output stage 25 through terminals 2 and 3 of socket 28 and by leads 35, 36. The ungrounded output terminal of oscillator 23 is connected to terminal 6 of the socket 28 by lead 37 for reasons to be described. When the receiver is operated to utilize a standard, uncoded television signal, terminals 4 and 5, 2 and 3, 1 and 7 of socket 28 are connected together as shown by the dotted lines, to complete the aforedescribed connections.

Assume for the moment that the adapter is not in circuit, and the television receiver is tuned to receive an uncoded television signal. Such a signal is intercepted by antenna 11, 12, amplified in radio-frequency amplifier 10, and heterodyned to the selected intermediate frequency of the receiver by first detector 13. The resulting intermediate-frequency signal is amplified in intermediate-frequency amplifier 14 and detected in second detector 15 to produce a composite video signal. The video signal is amplified in video amplifier 16 and applied to the input electrodes 17 of reproducing device 18 to control the intensity of the cathode-ray beam developed therein in well-known manner.

The line- and field-synchronizing components are separated from the video components in synchronizing-signal separator 19, the field-synchronizing components being applied to field-sweep system 20 to control the operation thereof and, therefore, the field deflection of reproducing device 18 in synchronism with the received television signal. The line-synchronizing components are applied to phase detector 22 wherein they are compared with the signal developed by output stage 25. The phase detector develops a control signal having variations indicating phase changes between the line-synchronizing components and the signal from output stage 25, and this control signal synchronizes oscillator 23 at the required line frequency. The signal developed by oscillator 23 is applied to the input circuit of discharge tube 27 which obtains its anode exciting potential through terminals 1 and 7 of socket 28. The periodic firing of tube 27 by the output signal of oscillator 23 causes a recurring, peaked saw-tooth wave to be developed across discharge circuit 29, 30 and this wave is amplified by output stage 25 so that a saw-tooth current synchronized with the received television signal is applied to line-deflection elements 26. In this manner, the video components of the received television signal modulate the intensity of the cathode-ray beam in reproducing device 18 while the beam is scanned in a two dimensional pattern by deflection elements 21 and 26 in synchronism with the synchronizing components of the television signal. Device 18 is enabled, therefore, to reproduce the image intelligence represented by the television signal.

The composite video signal from second detector 15 is applied to gated AGC circuit 32 which responds to the peaks of its line-synchronizing components to develop an AGC signal related to the intensity of the received television signal. As previously pointed out, AGC circuit 32 derives a gating signal from oscillator 23 or from output stage 25, it being necessary for the gating signal to have peaked portions occurring in time coincidence with the line-synchronizing components of the television signal so that the AGC circuit responds only during the intervals of such components.

Referring now to Figure 2, the adapter illustrated therein includes a series of terminals 1–7 which are intended to be connected to similarly numbered terminals of socket 28 in Figure 1 when the adapter is connected into the receiver circuit. This may conveniently be effected by means of a plug which, when inserted into the socket, breaks the previously-shown connections between the various terminals thereof. The adapter comprises a wave-shaper and phase-shifter unit 50 having input terminals connected to terminal 6 and ground, and having output terminals connected to a decoder unit 51. Decoder 51 has a further pair of input terminals connected to a line circuit 52 which extends to the subscription transmitter and over which the key signal indicating the coding schedule of the subscription television signal is received. Still further input terminals of decoder unit 51 are connected to field-sweep system 20 of the receiver by leads 53 to derive field-blanking pulses therefrom, for reasons to be described. The output terminals of decoder 51 are connected to the input circuit of a discharge tube 54 having an anode connected to terminal 1. The adapter further comprises a wave-shaper 55 having input terminals connected to terminal 7 and ground, and having output terminals connected to terminal 3 and ground. Terminal 2 is open in this embodiment, and terminals 4 and 5 are connected together.

When the adapter of Figure 2 is connected into the circuit of the receiver of Figure 1, stages 50, 51 and 54 are interposed between the output terminals of oscillator 23 and the discharge circuit of discharge tube 27, the discharge tube itself being removed from the sweep circuit by the breaking of the connection between terminals 1 and 7 of socket 28. The anode of discharge tube 27 is now connected to wave shaper 55 by the new connection to terminal 7 and causes the wave-shaper to develop a suitable feed-back signal for phase detector 22. Since terminal 2 is now open, stage 25 no longer supplies a feed-back signal to the phase detector. It is assumed in this embodiment that the actuating signal for the AGC circuit 32 is derived from oscillator 23, and that the connection of the adapter into the circuit does not alter the connection from leads 33 to leads 34.

Assume now that the receiver of Figure 1 with the adapter of Figure 2 connected into its line-sweep system is tuned to a subscription television signal in which coding is effected by varying the timing of the video components relative to the line-synchronizing components at certain spaced intervals, the times of occurrence of which are indicated by corresponding bursts of key signal received over line circuit 52. The subscription television signal is amplified, detected and applied to the input electrodes of reproducing device 18 as in the case of the uncoded television signal. The field-synchronizing components of the subscription television signal control the operation of field-sweep system 20, and its line-synchronizing components are applied to phase detector 22 which controls the operation of oscillator 23 and causes it to generate an output signal synchronized with the line-synchronizing components. The output signal of the oscillator is impressed on wave-shaper and phase shifter 50 by way of terminal 6, and unit 50 develops a periodic wave synchronized with the output signal of the oscillator but shifted slightly in phase relative thereto, for reasons to be described. This periodic wave is applied to decoder 51 and causes it to apply a signal to discharge tube 54 synchronized with the line-synchronizing components, and having a selected time relation relative thereto which is altered from time to time for decoding purposes. The operation of units 50 and 51 is to be described in detail hereinafter, it being sufficient for present purposes to state that the output signal from the decoder has a timing that varies during the aforementioned spaced intervals so that the timing of the peaked saw-tooth wave produced across discharge circuit 29, 30 also varies in turn varying the timing of the output signal of output stage 25 to provide a desired compensation in reproducing device 18 of the television receiver.

It is to be noted that the line-synchronizing components of the subscription television signal have an invariable timing, whereas the signal developed by output stage 25 has a timing which shifts in accordance with the coding schedule. For this reason, the latter signal can no longer be used for phase-comparison purposes in phase detector 22 and, therefore, the connection between terminals 2 and 3 of socket 28 is broken, terminal 2 being left open. However, the output signal of oscillator 23 does not vary in accordance with the coding schedule since the decoder is connected into the line-sweep system subsequent to this stage. This latter output signal is impressed on discharge tube 27 whose anode is now connected to wave shaper 55 which supplies to phase detector 22 by way of terminal 3 and lead 36 a feed-back signal of suitable wave form having a timing unrelated to the coding schedule. As previously stated, it is assumed in this embodiment that the gating signal for AGC circuit 32 is derived from oscillator 23, and since this oscillator generates a signal synchronized with the line-synchronizing components and whose timing is unrelated to the coding schedule it still can form an appropriate source for the gating signal and for that reason the connection across terminals 4 and 5 from leads 33 to 34 is undisturbed.

The wave-shaper and phase-shifter 50 of Figure 2, shown in detail in Figure 3, comprises a pair of input terminals 60 connected to ground and to terminal 6. The ungrounded input terminal is further connected to the primary winding 61 of a transformer 62 through a resistor 63 and series-connected capacitor 64. The secondary winding 65 of transformer 62 is shunted by a capacitor 66 to form a tuned circuit resonant at the frequency of the output signal from oscillator 23. One side of the secondary winding is connected to ground and the other is connected through a resistor 67 to one of the output terminals 68 of the circuit. The other output terminal is connected to ground and through a capacitor 69 to resistor 67, resistor 67 and capacitor 69 forming a phase-shifting network.

It is usual practice to operate oscillator 23 in class C so that its output signal has the form of a series of pulses whose repetition frequency corresponds to the line-synchronizing frequency of the system. These pulses are impressed on input terminals 60 and produce a sine wave across tuned circuit 65, 66. This sine wave is phase shifted slightly, for reasons to be described, by network 67, 69, and the phase shifted sine wave appearing across terminals 68 is applied to decoder 51.

The decoder 51 may be similar to that disclosed and claimed in copending application Serial No. 79,432, filed March 3,1949, and issued March 24, 1953 as Patent 2,632,784 in the name of Albert Cotsworth III et al., entitled "Decoding Apparatus for Television Receivers," and in copending application Serial No. 341,681, filed March 11, 1953, in the name of Pierce E. Reeves, entitled "Subscription Television Control Circuit," both of which are assigned to the present assignee, and is shown in detail in Figure 4. It includes a pair of input terminals 75 connected to the line circuit 52 and to the primary winding 76 of transformer 77. The secondary winding 78 of the transformer is connected to ground and through a capacitor 79 to the control electrode 80 of an electron-discharge device 81. Control electrode 80 is connected to ground through a grid-leak resistor 82, and the cathode 83 of device 80 is connected to ground through a resistor 84 shunted by a capacitor 85. The anode 86 of device 81 is connected to the positive terminal of a source of unidirectional potential 87 through the primary winding 88 of a coupling transformer 89, the secondary winding 90 being connected to ground and to a rectifier 91. Rectifier 91 is connected to ground through a resistor 92 shunted by a capacitor 93, and the junction of rectifier 91 and resistor 92 is connected to the control electrode 94 of an electron-discharge device 95 through a resistor 96.

The decoder also includes a pair of input terminals 97 connected to leads 53, and also connected to ground and to control electrode 94 through a series-connected resistor 98 and capacitor 99. The cathode 100 of device 95 is connected to ground and the anode 101 of this device is connected to the positive terminal of source 87 through a load resistor 102 and to ground through a resistor 103. The ungrounded terminal 97 is further connected to anode 101 through a resistor 104 and series-connected capacitor 105.

The anode 101 is coupled to the control electrode 106 of an electron-discharge device 107 through a coupling capacitor 108, control electrode 106 being connected to ground through a resistor 109. The cathode 110 of device 107 is connected to ground through a resistor 111, and the anode 112 of this device is connected to the positive terminal of source 87 through a resistor 113 and is coupled to the control electrode 114 of an electron-discharge device 115 through a capacitor 116. Control electrode 114 is connected to the cathode 117 of device 115 through a resistor 118, and the cathode 117 is directly connected to cathode 110 of device 107. The anode 119 of device 115 is connected to the positive terminal of source 87 through a resistor 120 and to control electrode 106 through a resistor 121.

The anode 119 of device 115 is connected to ground through series-connected resistors 122, 123 and 124, resistor 123 having a variable tap 125 associated therewith. Tap 125 is connected to the control electrode 126 of an electron-discharge device 127 through a variable resistor 128 and series-connected resistor 129.

The decoder includes yet another pair of input terminals 130 which are connected to the wave-shaper and phase-shifter 50, one of the terminals being connected to ground and the other coupled to control electrode 126 through a capacitor 131. The anode 132 of device 127 is connected to the positive terminal of source 87 through the primary winding 133 of a transformer 134, and the cathode 135 of device 127 is connected through the secondary winding 136 of transformer 134 and through a series-connected resistor 137 to ground. The anode 132 of device 127 is connected to one of the output terminals 138, the other output terminal being connected to ground. These output terminals are connected to discharge tube 54 as shown in Figure 2.

As fully described in the aforementioned Roschke patent, coding of the subscription television signal is effected by altering the timing of the video components relative to the line-synchronizing components during spaced operating intervals, the times of occurrence of these intervals being indicated to the subscriber receivers by bursts of key signal on line circuit 52. To eliminate any distortions that might arise and to obviate the effect of slight delays of the key signal in the line circuit, the changes in timing of the video components are made to occur at the transmitter during the field-retrace intervals following the initiation and termination of each burst of key signal on the line circuit, rather than in time coincidence with such initiation and termination. The decoder of Figure 4 effectively decodes the subscription television signal by altering the timing of the sweep signal applied to the line-deflection elements of the reproducing device 18 by a compensating amount, and during the field-retrace intervals immediately succeeding the initiation and termination of each key-signal burst on line circuit 52.

The bursts of key signal received over line circuit 52 are applied to device 81 wherein they are amplified, and the bursts are then rectified by rectifier 91 so that negative-polarity rectified bursts appear across resistor 92. Positive-polarity field-blanking pulses from field-sweep system 20 are applied to terminals 97 and through resistor 98 and capacitor 99 to control electrode 94 of device 95. The circuit parameters are so chosen that, during the intervals between the bursts of key signal, device 95 is conductive and the positive-polarity field-blanking pulses are amplified thereby and appear across resistor 103 with negative polarity and twice their original amplitude. The positive-polarity field-blanking pulses are also supplied to the junction of resistors 102 and 103 through resistor 104 and capacitor 105 and appear across resistor 103 with positive polarity. The end result is that during these intervals due to the superpositioning of the negative-polarity double-amplitude pulses and the positive-polarity pulses, negative-polarity pulses are applied to control electrode 106 of discharge device 107. However, when a burst of key signal is received over line circuit 52, the resulting negative-polarity rectified burst appearing across resistor 92 biases device 95 to its non-conductive state so that the field-blanking pulses are no longer translated by this device. During these latter intervals, only the positive-polarity pulses derived through resistor 104 and capacitor 105 appear across resistor 103. Therefore, negative-polarity pulses are applied to control electrode 106 during the intervals between the bursts of key signal on line circuit 25, and positive-polarity pulses are supplied thereto for approximately the duration of each key-signal burst. It is to be noted, that in each instance the field-blanking pulses applied to control electrode 106 following the initiation and termination of each key-signal burst have changed polarity.

The devices 107 and 115 are connected as a multivibrator circuit of the well known "single-shot" type. That is, the multivibrator circuit of this device is actuated from a first condition wherein device 107 is conductive and device 115 non-conductive, to a second condition wherein device 115 is conductive and device 107 is non-conductive, by a negative-polarity pulse immediately succeeding a positive-polarity pulse; and returned to its first condition by a positive-polarity pulse immediately succeeding a negative-polarity pulse. The multivibrator circuit develops across resistors 122, 123 and 124 pulses corresponding to each burst of key signal on line circuit 52 yet displaced in time relative thereto so that the leading and trailing edges of these pulses occur during the field-retrace intervals immediately succeeding the initiation and termination of each key-signal burst.

As previously stated, unit 50 of Figure 2 produces a sine wave synchronized with the line-synchronizing components but slightly displaced in phase relative thereto. This sine wave is applied to control electrode 126 of device 127 by way of the input terminals 130. Device 127 forms a well-known blocking-oscillator circuit and is triggered by the sine wave applied to terminals 130 as each positive half-cycle of the sine wave increases in a positive direction beyond the triggering point of the circuit. During the intervals between the pulses developed across resistors 122—124, the aforementioned sine wave triggers the blocking oscillator at a selected point on each of its positive half-cycles so that pulses having a selected timing relative to the sine wave are produced across terminals 138. However, for the duration of each pulse across resistors 122—124 the sine wave is pedestalled thereon and triggers the blocking oscillator at another point on each of its positive half-cycles, thus altering the timing of the pulses developed across terminals 138 relative to the sine wave due to the sloping characteristic of the sine wave. Thus, the purpose of unit 50 is to transform the pulses produced by oscillator 23 into a wave having a sloping characteristic so that when pedestalled the timing of the blocking oscillator is altered. Moreover, the phase of this wave is shifted slightly with respect to the pulses from oscillator 23 so that during the intervals between the pulses across resistors 122—124, the blocking oscillator may be triggered at about the mid-point of the positive slope of each cycle of the wave and yet produce pulses in phase with the pulses developed by oscillator 23.

The amplitude of the pulses across resistors 122—124 applied to the blocking oscillator may be adjusted by variation of tap 125, and this adjusts the amount the sine wave is pedestalled and thus the timing shift of the blocking oscillator for the duration of such pulses. The triggering point of the blocking oscillator may be adjusted by variation of resistor 128 in the grid circuit of device 127. Therefore, resistor 128 can be adjusted so that during the intervals between the pulses across resistors 122—124, the pulses produced across terminals 138 are synchronized and in phase with the pulses produced by oscillator 23 and, thus, with the incoming line-synchronizing pulses; and the tap 125 may be varied so that during the intervals when the timing of the video components of the received subscription television signal is altered the timing of the pulses developed across terminals 138 is altered by a corresponding amount to compensate therefor.

The wave-shaper 55 is shown in Figure 5 and includes a pair of input terminals 200 connected to ground and to terminal 7. The ungrounded terminal 200 is connected to the positive terminal of a source of unidirectional potential 201 through a resistor 202, and to ground through a capacitor 203 and series-connected capacitor 204. The junction of capacitors 203 and 204 is connected to one of the output terminals 205, the other output terminal being connected to ground. The ungrounded output terminal 205 is connected to terminal 3.

As previously pointed out the function of wave-shaper 55 is to develop a feed-back signal for phase detector 22. In the present embodiment the wave-shaper utilizes the discharge tube 27 of the receiver to develop a saw-tooth wave across output terminals 205 which has an invariable timing relative to the incoming synchronizing components, this wave being impressed on phase detector 22 by way of terminal 3.

The embodiment of the invention shown in Figure 6 is similar to that of Figure 2 with the exception that in this embodiment it is assumed that the gating signal for AGC circuit 32 is derived from output stage 25 during normal operation of the receiver, which (as previously pointed out) no longer forms an appropriate source for this gating signal when the adapter is connected into the receiver circuit. Unlike the adapter of Figure 2, the adapter of Figure 6 breaks the connection between terminals 4 and 5 of socket 28, and includes an AGC gate-signal-shaper 210 having input terminals connected to terminal 7 and ground, and output terminals connected to terminal 4 and ground, terminal 5 being left open. The shaper 210, like shaper 55, utilizes discharge tube 27 to develop a signal synchronized with the incoming line-synchronizing components and having a timing that is not related to the coding schedule. In the present embodiment this signal takes the form of a sine wave which is applied to the AGC circuit by way of terminal 4 and lead 34.

Shaper 210 is shown in detail in Figure 7 and includes a pair of input terminals 215 connected to ground and to terminal 7. The ungrounded terminal 215 is connected to the control electrode 220 of an electron-discharge device 221 through a capacitor 222, the control electrode being connected to ground through a grid-leak resistor 223. The cathode 224 of device 221 is connected to ground through a resistor 225 which is shunted by a capacitor 226. The anode 227 of device 221 is connected to the positive terminal of a source of unidirectional potential 228 through the primary winding 229 of a transformer 230. The secondary winding 231 of transformer 230 is shunted by a capacitor 232 and is connected to the output terminals 233 of the circuit. Output terminals 233 are further connected to terminal 4 and to ground. Pulses from oscillator 23 are applied to discharge device 221 by way of discharge tube 27 and corresponding amplified pulses appearing in the anode circuit of this device are transformed to a sine wave by transformer 230, secondary winding 231 and capacitor 232 forming a resonant circuit tuned to the frequency of these pulses. The resulting sine wave is developed across output terminals 233, and this sine wave is synchronized as to frequency and phase with the output signal of controlled oscillator 23.

The third embodiment of the invention, shown in Figure 8, is similar in most respects to the embodiment in Figure 6 with the exception that all the phase-shifting units are contained in a single circuit. This embodiment includes a wave-shaping unit 300 having output terminals connected to decoder 51 and terminal 3 and 4, and having output terminals connected to terminal and to ground, terminals 2, 5 and 6 being left open.

The output signal of controlled oscillator 23 is applied to wave-shaping unit 300 through discharge tube 27 and by way of terminal 7. Unit 300 responds to this signal to develop a phase-shifted sine-wave for application to decoder 51 over leads 301, a saw-tooth feed-back signal for application to phase detector 22 over lead 302 and by way of terminal 3, and a sine-wave gating-signal for application to AGC circuit 32 over lead 303 and by way of terminal 4. That is, wave-shaping unit 300 takes the place of units 50, 55 and 210 of the embodiment of Figure 6.

Wave-shaping unit 300 is shown in detail in Figure 9, and includes a pair of input terminals 320 connected to ground and to discharge tube 27 by way of terminal 7. The ungrounded terminal 320 is further connected to the positive terminal of a source of unidirectional potential 321 through the primary winding 322 of a transformer 323 and through a series-connected resistor 324, the junction of winding 322 and resistor 324 being connected to ground through series-connected capacitors 325 and 326. The junction of capacitors 325 and 326 is connected to one of the output terminals 327, the other output terminal being grounded. Terminals 327 are connected to phase-detector 22 by way of lead 302 and terminal 3.

One side of the secondary winding 328 of transformer 323 is connected to ground through a capacitor 329, and the other side is connected to ground through a capacitor 330. The junction of winding 328 and capacitor 330 is connected to one of the output terminals 331, the other terminal being grounded. Terminals 331 are connected to AGC circuit 32 by way of lead 303 and terminal 4.

The junction of winding 328 and capacitor 329 is connected to the control electrode 332 of an electron-discharge device 333 through a coupling capacitor 334, the control electrode 332 being connected to ground through a grid-leak resistor 335. The cathode 336 of device 333 is connected to ground through a resistor 337, and the anode 338 of this device is connected to the positive terminal of a source of unidirectional potential 339 through a resistor 340. Anode 338 is connected to cathode 336 through a variable resistor 341 and series-connected capacitor 342. The output terminals 344 are connected to the junction of resistor 341 and capacitor 342, and to ground.

The pulses from synchronized oscillator 23, which are impressed on input terminals 320 by way of discharge tube 27, are transformed into a saw-tooth wave across capacitor 326 in a manner similar to the arrangement of Figure 5. As previously pointed out, this saw-tooth wave is used as a feed-back signal for phase detector 22. The secondary winding 328 and capacitors 329, 330 form a resonant circuit tuned to the repetition frequency of the afore-mentioned pulses, so that a sine wave is developed across capacitor 329 and across capacitor 330. The sine wave developed across capacitor 330 is applied to output terminals 331 and used as a gating signal for AGC circuit 32. The sine wave developed across capacitor 329 is applied to discharge device 333 which develops a corresponding since wave across terminals 344, but phase-shifted by a selected amount by the adjustment of resistor 341. The phase-shifted sine wave is applied to terminals 344 for application to decoder 51.

It is to be understood that although the various components of the adapter have been described as producing signals of particular wave forms, such as sine waves and saw-tooth waves, equivalent circuits may be substituted for these components which product other types of wave forms should such be required by the television receiver to be converted for subscription purposes.

The invention provides, therefore, an improved subscription television receiver which is capable of generating signals required by the receiver for proper operation thereof that are not affected by the timing changes produced by the decoding apparatus in the output signal of the sweep system.

While particular embodiments of the invention have been shown and described, modifications may be made and it is intended in the appended claims to cover all such modifications as may fall within the true spirit and scope of the invention.

I claim:

1. A subscription television receiver comprising: a source of synchronizing pulses; a sweep system of the automatic-frequency-controlled type coupled to said source and including a cascade-connected synchronized oscillator and an output stage, said system being responsive to said sychronizing pulses for developing a periodic sweep signal synchronized with said synchronizing pulses; decoding means connected between said synchronized oscillator and said output stage for varying, in accordance with a prescribed coding schedule, the timing of the sweep signal developed by said system relative to said synchronizing pulses; a network connected to said synchronized oscillator for developing a periodic signal synchronized with said synchronizing pulses and having a timing independent of timing variations of the sweep signal; and means for supplying the periodic signal developed by said network to said sweep system for automatic frequency control purposes.

2. A subscription television receiver comprising: a source of synchronizing pulses; a sweep system of the automatic-frequency-controlled type coupled to said source and including a cascade-connected synchronized oscillator, discharge tube, and output stage, said system being responsive to said synchronizing pulses for developing a periodic sweep signal synchronized with said synchronizing pulses; decoding means connected between said synchronized oscillator and said output stage for varying, in accordance with a prescribed coding schedule, the timing of the sweep signal developed by said system relative to said synchronizing pulses; a network connected to said discharge tube for developing a periodic signal synchronized with said synchronizing pulses and having a timing independent of timing variations of the sweep signal; and means for supplying the periodic signal developed by said network to said sweep system for automatic frequency control purposes.

3. A subscription television receiver comprising: a source of synchronizing pulses; a sweep system of the automatic-frequency-controlled type coupled to said source and including a cascade-connected synchronized oscillator, a first discharge tube, and an output stage, said system being responsive to said synchronizing pulses for developing a periodic sweep signal synchronized with said synchronizing pulses; a cascade-connected decoder and a second discharge tube connected between said synchronized oscillator and said output stage for varying, in accordance with a prescribed coding schedule, the timing of the sweep signal developed by said system relative to said synchronizing pulses; a network connected to said first discharge tube for developing a periodic signal synchronized with said synchronizing pulses and having a timing independent of timing variations of the sweep signal; and means for supplying the periodic signal developed by said network to said sweep system for automatic frequency control purposes.

4. A subscription television receiver comprising: a source of synchronizing pulses; a sweep system of the automatic-frequency-controlled type coupled to said source and including a cascade-connected synchronized oscillator and a first discharge tube with an associated discharge circuit, said system being responsive to said synchronizing pulses for developing a periodic sweep signal synchronized with said synchronizing pulses; a cascade-connected decoder and a second discharge tube connected between said synchronized oscillator and said discharge circuit for varying, in accordance with a prescribed coding schedule, the timing of the sweep signal developed by said system relative to said synchronizing pulses; another discharge circuit connected to said first discharge tube for developing a periodic signal synchronized with said synchronizing pulses and having a timing independent of timing variations of the sweep signal; and means for supplying the periodic signal developed by said another discharge circuit to said sweep system for automatic frequency control purposes.

5. A subscription television receiver comprising: a source of synchronizing pulses; a sweep system of the automatic-frequency-controlled type coupled to said source and including a cascade-connected synchronized oscillator and a first discharge tube with an associated discharge circuit, said system being responsive to said synchronizing pulses for developing a periodic sweep signal synchronized with said synchronizing pulses; a cascade-connected wave-shaper and phase-shifter stage, a decoder and a second discharge tube connected between said synchronized oscillator and said discharge circuit for varying, in accordance with a prescribed coding schedule, the timing of the sweep signal developed by said system relative to said synchronizing pulses; another discharge circuit connected to said first discharge tube for developing a periodic signal synchronized with said synchronizing pulses and having a timing independent of timing variations of the sweep signal; and means for supplying the periodic signal developed by said another discharge circuit to said sweep system for automatic frequency control purposes.

6. A subscription television receiver comprising: a gated automatic-gain-control stage; a source of synchronizing pulses; a sweep system of the automatic-frequency-controlled type coupled to said source and including a cascade-connected synchronized oscillator and a first discharge tube with an associated discharge circuit, said system being responsive to said synchronizing pulses for developing a periodic gating signal for said gain-control stage and for also developing a periodic sweep signal; a cascade-connected decoder and a second discharge tube connected between said synchronized oscillator and said discharge circuit for varying, in accordance with a prescribed coding schedule, the timing of the sweep signal developed by said system relative to said synchronizing pulses; another discharge circuit connected to said first discharge tube for developing a periodic feed-back signal for said sweep system synchronized with said synchronizing pulses and having a timing independent of timing variations of the sweep signal; means for supplying the periodic feed-back signal developed by said another discharge circuit to said sweep system for automatic frequency control purposes; a shaper circuit connected to said first discharge tube for developing a gating signal for said gain-control stage synchronized with said synchronizing pulses and having a timing independent of timing variations of the sweep signal; and means for supplying the gating signal developed by said shaper circuit to said gain-control stage for automatic gain control purposes.

7. A subscription television receiver comprising: a gated automatic-gain-control stage; a source of synchronizing pulses; a sweep system of the automatic-frequency-controlled type coupled to said source and including a first discharge tube with an associated discharge circuit, said system being responsive to said synchronizing pulses for developing a periodic gating signal for said gain-control stage and for also developing a periodic sweep signal; a cascade-connected decoder and a second discharge tube for varying, in accordance with a prescribed coding schedule, the timing of the sweep signal developed by said sweep system relative to said synchronizing pulses; a wave-shaping unit coupled to said sweep system and to said gain-control stage for supplying a control signal to said decoder, for supplying a periodic feed-back signal to said sweep system, and for also supplying a gating signal to said gain-control stage, all of said signals supplied by said wave-shaping unit being synchronized with the applied synchronizing pulses and having a timing independent of timing variations of the sweep signal; and means connecting said wave-shaping unit and cascade-connected decoder and second discharge tube into said sweep system between said first discharge tube and its associated discharge circuit.

References Cited in the file of this patent

UNITED STATES PATENTS 2,566,764 Fyler et al. ------------- Sept. 4, 1951

OTHER REFERENCES

"Rider Television Manual," TV., p. 2–11 and 12, Farnsworth Model 651 P, 661–P, 1949.